(12) United States Patent
Fujita et al.

(10) Patent No.: US 9,484,585 B2
(45) Date of Patent: Nov. 1, 2016

(54) NON-AQUEOUS ORGANIC ELECTROLYTIC SOLUTION FOR LITHIUM PRIMARY BATTERY, AND LITHIUM PRIMARY BATTERY

(71) Applicants: FDK Corporation, Tokyo (JP); FDK Tottori Co., Ltd., Tottori (JP)

(72) Inventors: Yoshie Fujita, Tottori (JP); Satoru Naruse, Tottori (JP); Satoshi Sunada, Tottori (JP); Naoaki Nishimura, Tokyo (JP); Takahide Kobashi, Tottori (JP)

(73) Assignees: FDK Corporation, Tokyo (JP); FDK Tottori Co., Ltd., Tottori (JP)

( * ) Notice: Subject to any disclaimer, the term of this patent is extended or adjusted under 35 U.S.C. 154(b) by 1 day.

(21) Appl. No.: 14/613,939

(22) Filed: Feb. 4, 2015

(65) Prior Publication Data

US 2015/0221984 A1    Aug. 6, 2015

(30) Foreign Application Priority Data

Feb. 5, 2014  (JP) ................. 2014-020215

(51) Int. Cl.
| | |
|---|---|
| *H01M 6/16* | (2006.01) |
| *H01M 4/50* | (2010.01) |
| *H01M 4/38* | (2006.01) |
| *H01M 4/40* | (2006.01) |
| H01M 10/0567 | (2010.01) |

(52) U.S. Cl.
CPC ............ *H01M 6/168* (2013.01); *H01M 4/382* (2013.01); *H01M 4/405* (2013.01); *H01M 4/502* (2013.01); *H01M 10/0567* (2013.01)

(58) Field of Classification Search
CPC .... H01M 4/502; H01M 4/382; H01M 6/168; H01M 10/0567; H01M 4/405
See application file for complete search history.

(56) References Cited

U.S. PATENT DOCUMENTS

2013/0157120 A1*  6/2013  Shimura ............... H01M 4/131
                                                         429/163

FOREIGN PATENT DOCUMENTS

| JP | 3416016 B2 | 4/2003 |
|---|---|---|
| JP | 4259043 B2 | 2/2009 |

OTHER PUBLICATIONS

FDK Corporation, "Lithium battery," [online] <URL: http://www.fdk.co.jp/battery/lithium/index.html>, accessed Sep. 7, 2013.

* cited by examiner

*Primary Examiner* — Laura Weiner (74) *Attorney, Agent, or Firm* — Harness, Dickey & Pierce, P.L.C.

(57) ABSTRACT

There is provided non-aqueous organic electrolytic solution for a lithium primary battery which can be stored for long period at elevated temperatures or at the end stage of discharge. Non-aqueous organic electrolytic solution 20 for lithium primary battery 1 having a cathode active material which is manganese dioxide and an anode active material which is either of lithium or lithium alloy includes a base electrolytic solution that is composed of organic solvent and supporting electrolyte and to which either one of hydroxyphthalimide or hydroxyphthalimide derivative is added as an additive. An amount of the additive which is added to the base electrolytic solution is 0.1 wt % or more and 5.0 wt % or less. It is more preferable that the amount of the additive which is added to the base electrolytic solution is 0.1 wt % or more and 1.0 wt % or less.

2 Claims, 7 Drawing Sheets

NON-AQUEOUS ORGANIC ELECTROLYTIC SOLUTION FOR LITHIUM PRIMARY BATTERY, AND LITHIUM PRIMARY BATTERY

CROSS-REFERENCE TO RELATED APPLICATIONS

The present application claims priority from Japanese Patent Application No. 2014-20215 filed on Feb. 5, 2014, which is herein incorporated by reference.

BACKGROUND

1. Technical Field

The invention relates to non-aqueous organic electrolytic solution for a lithium primary battery, and a lithium primary battery. Specifically, the invention relates to a technique for modifying non-aqueous organic electrolytic solution included in a lithium primary battery whose cathode active material is manganese dioxide and whose anode active material is lithium or lithium alloy.

2. Related Art

In lithium primary batteries, lithium or lithium alloy is used as an anode active material and manganese dioxide, copper oxide or the like is used as a cathode active material. The lithium primary batteries have a construction in which a positive electrode material containing cathode active material and a negative electrode material containing the anode active material are placed in a cell can with a separator therebetween, and in which the cell can is filled with non-aqueous organic electrolytic solution and is sealed.

The lithium primary batteries, especially those using manganese dioxide as a cathode active material, have high energy density and the following features: it is possible to discharge for long period and the voltage drop is small until the end stage of discharge. The lithium primary batteries are therefore widely used in power supplies of devices such as a stationary gas meter, a stationary water meter and the like, which continue to supply power to the devices for long period. In addition, lithium primary batteries which have not yet been used can be stored for long period. There are various types of lithium primary batteries which are different in the shape of the cell can, positional relationship in the cell can between the positive electrode material and the negative electrode material or the like. The following Non Patent Literature 1 describes the constructions of various lithium primary batteries and the like.

[Non Patent Literature 1] FDK CORPORATION, "Lithium battery", [online], [search result on Sep. 7, 2013], Internet <URL:http://www.fdk.co.jp/battery/lithium/index.html>

In lithium primary batteries, when a battery is stored at elevated temperatures, decomposition of the electrolytic solution produces gas. The gas increases the pressure in the battery, and leakage may occur in some cases. In lithium primary batteries using manganese dioxide as a cathode active material, when a battery is stored at a deep depth of discharge, the internal resistance increases. More specifically, though a device which operates for long period using lithium primary batteries (e.g. a gas meter and a water meter) gradually loses the capacities of its lithium primary batteries as a result of long-term use, the device operates with almost no problems till the capacities of the lithium primary batteries embedded therein are used up. This is because of their flat discharge characteristics, that is, the voltage drop is small until the end stage of discharge. That is, the device suddenly stops at the time of "dead battery", in which the capacity is used up. As for a device which has a lithium primary battery as a power source and operates for long period, it is therefore necessary to change its batteries in good time for dead battery. Generally, batteries are replaced periodically before the device will stop due to dead battery.

In some cases, however, a device may stop before the time of battery replacement and may be left for long period because of moving or long-term absence. In this case, the problem that the device cannot be restarted after long-term stop may occur. Whereas lithium primary batteries which have not been used yet have an excellent long-term storability, long-term storage after a battery is once discharged increases the internal resistance. If a device stops at a time near the end of discharge (at a deep depth of discharge), it is therefore impossible to generate a voltage for restarting the device. This makes the device inoperable.

SUMMARY

A primary aspect of the invention is to provide a lithium primary battery which has an excellent storability at elevated temperatures and can be stored for long period at the end stage of discharge.

An aspect of the invention to achieve the above advantage is a non-aqueous organic electrolytic solution for a lithium primary battery, the lithium primary battery having
a cathode active material which is manganese dioxide and
an anode active material which is either of lithium and lithium alloy,
including:
a base electrolytic solution
that is composed of organic solvent and supporting electrolyte, and
to which either one of hydroxyphthalimide and hydroxyphthalimide derivative is added as an additive,
an amount of the additive which is added to the base electrolytic solution is 0.1 wt % or more and 5.0 wt % or less.

It is more preferable that the amount of the additive which is added to the base electrolytic solution is 0.1 wt % or more and 1.0 wt % or less.

Another aspect of the invention is a lithium primary battery including:
a cathode active material which is manganese dioxide;
an anode active material which is either of lithium and lithium alloy; and
the foregoing non-aqueous organic electrolytic solution.

DESCRIPTION OF EXEMPLARY EMBODIMENTS

Process to the Invention

As mentioned above, in lithium primary batteries, gas is produced at elevated temperatures due to decomposition of the electrolytic solution, and long-term storage of a battery which has been used once increases the internal resistance. Of these two phenomena, a cause of the former one is volatilization or thermal decomposition of organic solvent contained in the electrolytic solution, for example. But, the cause of the latter phenomenon is not well understood. The inventors have discussed the cause of the phenomenon, and consider that it can be explained by the following mechanism.

Firstly, when a lithium primary battery whose cathode active material is manganese dioxide is embedded in a device and used, manganese (Mn) ions contained in the cathode active material dissolve. If the use of a lithium primary battery is ceased in midstream and the battery is left for long period, dissolving Mn ions are gradually reduced on the surface of the negative electrode and metal Mn is deposited. The deposited metal Mn makes a coating which covers the negative electrode and increases the interface resistance of the negative electrode, which results in increase of the internal resistance of the battery.

Next, the inventors have thought as follows. Assuming the foregoing mechanism, coating with ionic conductivity is formed on the cathode active material and the anode active material, that is, coating which lithium ions (Li ions) selectively pass through is formed. This can prevent Mn ions from dissolving from the positive electrode and also can prevent Mn from being deposited on the negative electrode. And, the non-aqueous organic electrolytic solution (hereinafter referred to as an electrolytic solution), which is in contact with both of the cathode and anode active materials, is modified and is given an ability for forming the foregoing coating. The coating can therefore be formed quickly on both active materials.

It goes without saying that the modifying of the electrolytic solution must not cause considerable deterioration of ionic conductivity, which is a basic characteristic as an electrolytic solution. It is also important to realize steady manufacturing of the modified electrolytic solution without additional cost. Taking the foregoing conditions into account, the following approach is practical: a common or typical electrolytic solution for lithium primary batteries is modified by adding to the electrolytic solution a material which is the source of the coating (additive).

In related art which the inventors have found during research and development, there is however no example of an additive which can form coating with electrical conductivity, the coating being for electrolytic solutions of lithium primary batteries. And, the inventors have diligently researched while reviewing various experimental results and information gained from the foregoing consideration and through research and development, and it consequently has been found that it is possible to improve the long-term storability of lithium primary batteries at elevated temperatures and at the end stage of discharge by using hydroxyphthalimide (hereinafter referred to as HPI) or a derivative thereof (hereinafter referred to as an HPI derivative) as an additive and optimizing the amount of the additive; such HPI and HPI derivatives have not been used as non-aqueous organic electrolytic solutions of the lithium primary batteries at all.

Additive

During research and development for the purpose of addressing the two phenomena specific to the lithium primary battery at once, the inventors have found that HPI and its derivatives are useful as an additive. HPI and HPI derivatives are well-known compound, and applications of batteries are described in Japanese Patent No. 3416016, Japanese Patent No. 4259043 and the like. But, the inventions described in the two patent literatures are ones related to rechargeable lithium secondary batteries. In both of the patent literatures, HPI is added, for improving cycle characteristics unique to the secondary battery, as an additive to the electrolyte and to the positive electrode material. In lithium secondary batteries, metal oxide with a composition in which lithium (Li) is contained is used for the positive electrode, and carbon material is usually used for the negative electrode.

On the other hand, a lithium primary battery according to the invention includes the followings: the positive electrode containing manganese dioxide as a cathode active material, with a composition in which Li is not contained; and the negative electrode which consists of lithium or lithium alloy (for convenience, collectively referred to as "negative electrode lithium"), the lithium and lithium alloy serving as an anode active material. The negative electrode lithium of the lithium primary battery has a surface area relatively smaller than the positive electrode of the same lithium primary battery or than the difference in size between the cathode and the anode of a lithium secondary battery. The negative electrode lithium is therefore significantly affected by reaction with very small amounts of by-products produced during discharge or storage. That is, the lithium primary battery has the feature that reaction at the negative electrode is likely to appear in a manner of increase of the resistance of the negative electrode and in a manner of increase of the internal resistance of the battery. Taking the feature into account, in the case of the lithium primary batteries, prevention of deterioration of the negative electrode lithium means prevention of increase of the internal resistance or prevention of gassing at elevated temperatures; the resistance increase and the gassing occur when the batteries being stored at the end stage of discharge.

That is, in the lithium primary battery, the effect of adding HPI or a derivative thereof to the electrolytic solution is produced by a mechanism different from the effect of adding HPI to the electrolytic solution or the positive electrode in the lithium secondary battery. In other words, it has been difficult to find, based on techniques applied to lithium secondary batteries, effectiveness of HPI or a derivative thereof against a phenomenon specific to the lithium primary battery. It would have been extremely difficult to find effectiveness of HPI in the lithium primary battery unless the mechanism that storage capability deteriorates at the end stage of discharge were considered.

Indeed, in the inventions described in the foregoing patent literatures, cycle characteristics improve when HPI is added to the electrolyte and improve also when HPI is added to the positive electrode material. In cases of the lithium secondary battery, it can be considered that HPI affects cycle characteristics with the same mechanism. Those skilled in the art can however easily expect that the voltage lowers by adding HPI to the positive electrode material of a lithium primary battery with a composition in which Li is not contained. Accordingly, those skilled in the art cannot easily reach the idea of applying HPI or a derivative thereof lithium primary batteries in order to address the phenomenon specific to the lithium primary battery, HPI and its derivatives being used for improving the cycle characteristics of lithium secondary batteries.

Samples

As the embodiment of the invention, a lithium primary battery in which a suitable amount of HPI is added to the electrolytic solution will be described. In order to evaluate characteristics of the lithium primary battery according to this embodiment, a plurality of types of lithium primary batteries having different amounts of the added HPI are prepared as samples, the following two tests are conducted for these samples: a storage test at the end stage of discharge (hereinafter referred to as the deep depth-of-discharge (DOD) storage test); and a storage test at elevated temperatures (hereinafter referred to as the high-temperature storage test). It should be noted that, as the samples for facilitating determination of the test results, prepared are lithium primary batteries having different constructions which are suitable for each of the two tests.

Deep-DOD Storage Test
Construction of Samples

Figure 1:
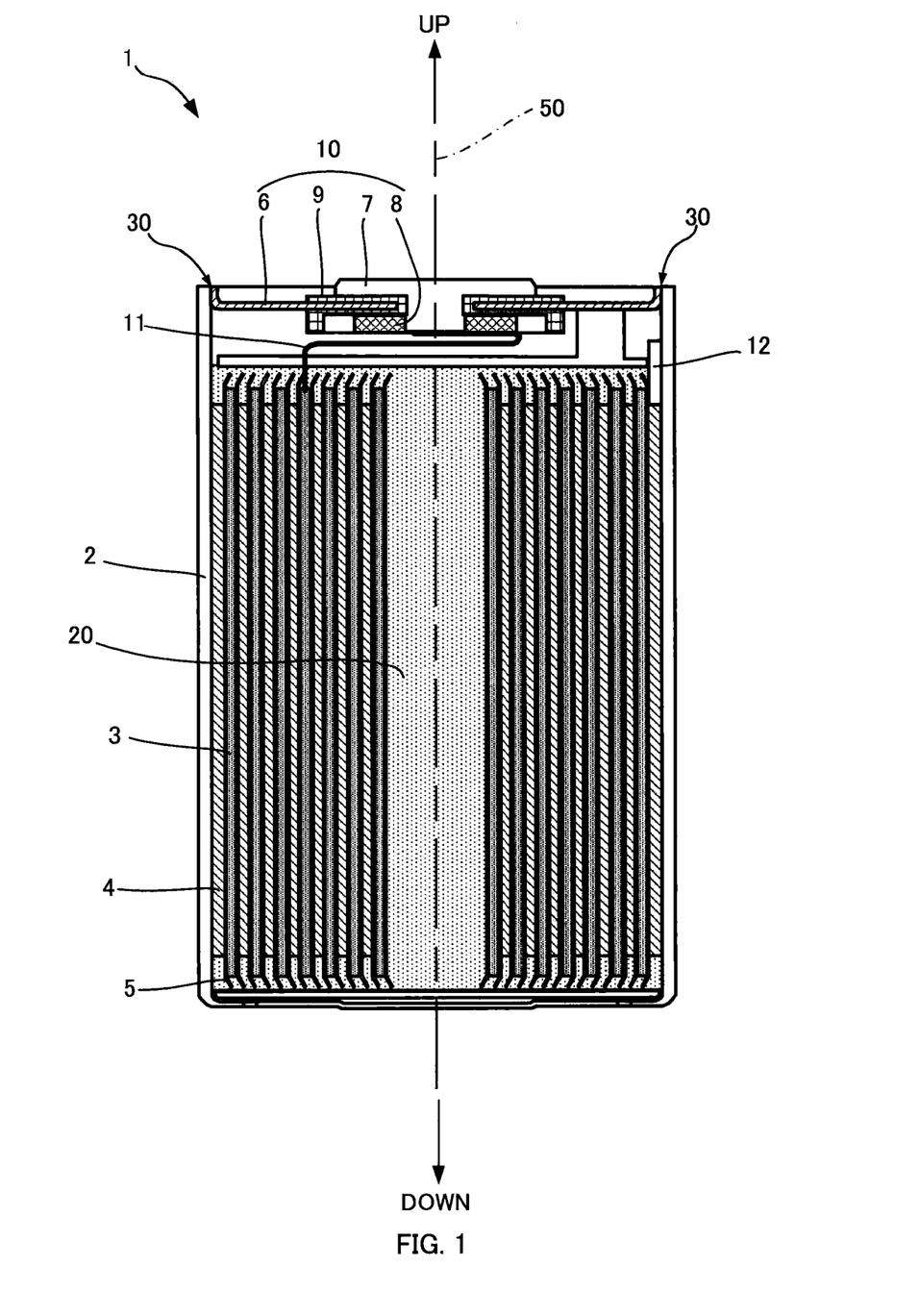
FIG. 1 is a diagram showing the construction of a spiral-wound lithium primary battery.

Firstly, in order to evaluate the long-term storage capability of the lithium primary battery according to this embodiment at the end stage of discharge, spiral-wound lithium primary batteries were prepared as samples. FIG. 1 shows the overall construction of the lithium primary batteries 1. Each of the lithium primary batteries 1 prepared for deep-DOD storage test is a cylinder having an external diameter of 17 mm and a height of 45 mm, and FIG. 1 is a longitudinal sectional view of the lithium primary battery 1 when a direction in which a cylinder axis 50 extends is the up-and-down (longitudinal) direction. The lithium primary battery 1 has a basic construction in which a cylindrical metal cell can 2 which has a bottom and serves as an anode can accommodates an active part composed of a positive electrode 3, a negative electrode 4, a separator 5, and electrolytic solution 20, and in which an opening of the cell can 2 is sealed by a sealing part 10 including a sealing plate 6, a positive terminal 7, a metal washer 8, and a sealing gasket 9.

Specifically, the positive electrode 3 constituting the active part is made by cutting a stainless steel lath to a certain size and drying it; on the stainless steel lath, a positive electrode material in slurry form is applied. As a positive electrode material, it is possible to use a mixture of electrolytic manganese dioxide (EMD: serving as a cathode active material), graphite (serving as electro-conductive substance) and a binder (a fluorine-based binder and the like) in a certain ration (e.g., EMD:graphite:binder=93 wt %:3 wt %:4 wt %). The positive electrode material which is formed into slurry with pure water is applied on a stainless steel lath.

The negative electrode 4 is negative electrode lithium in plate form, and lithium is used in this example. The negative electrode 4 and the positive electrode 3 are wound together with the separator 5 placed between these electrodes and are inserted into the cell can 2, the separator 5 being composed of microporous polyolefin film.

The sealing plate 6 constituting the sealing part 10 has a disk-like shape having an opening on the center of the plate. The edge of the disk is bent upwards when the side of the opening end in the cell can 2 is defined as the upside. At the central opening of the sealing plate 6, the metal positive terminal 7 and the metal washer 8 are caulked with the resin sealing gasket 9 placed between the terminal and the washer. The edge of the sealing plate 6 and the upper edge of the cell can 2 are laser-welded (at the position indicated by symbol 30 in the drawing). The opening of the cell can 2 is thereby sealed, and the cell can 2 is sealed. And, (the lath of) the positive electrode 3 is connected to the lower surface of the positive terminal 7 through a lead tab 11, and the negative electrode 4 is connected to the inner surface of the cell can 2 through a lead tab 12. The sealed cell can 2 is filled with electrolytic solution 20 in which the amount of the added HPI is different depending on the samples.

It should be noted that the solvent of the electrolytic solution 20 is a well-known, three-component non-aqueous solution in which the proportion of propylene carbonate (PC), ethylene carbonate (EC) and 1,2-dimethoxyethane (DME) is the volume ratio of 20 vol %: 20 vol %: 60 vol %. The base of the electrolytic solution 20 is a solution in which lithium triflate ($LiCF_3SO_3$) is dissolved in this solvent to a concentration of 0.8 mol/l, the lithium triflate serving as a supporting electrolyte. This base electrolytic solution is used as a common electrolytic solution for lithium primary batteries. HPI is added to the base electrolytic solution by an amount which depends on each sample.

Table 1 below shows the amount of the added HPI in the electrolytic solution of each of the samples.

TABLE 1

| Sample | Additive | Amount (wt %) |
|---|---|---|
| a1 | HPI | 0 |
| a2 | HPI | 0.1 |
| a3 | HPI | 0.6 |
| a4 | HPI | 0.8 |
| a5 | HPI | 1.0 |
| a6 | HPI | 5.0 |

As shown in Table 1, HPI is not added to the electrolytic solution of the sample a1, and the sample a1 falls under a spiral-wound lithium primary battery 1. And, HPI is added to the electrolytic solution of each of the samples a2-a6 at the following weight percentages: 0.1 wt %, 0.6 wt %, 0.8 wt %, 1.0 wt %, and 5.0 wt %.

Test Method

Each of the samples a1-a6 shown in Table 1 was prepared and then discharged up to 90% of design capacity while applying a load of 200Ω. That is, reproduced is a state at the end stage of discharge in which the depth of discharge was 90% and the remaining capacity was 10% of the design capacity. Then, the samples a1-a6 which had been discharged as mentioned above were stored at a temperature of 40° C., and the changes of the internal resistance and the battery voltage during storage were observed. In this way, the storage characteristics of the lithium primary batteries according to this embodiment at the end stage of discharge were evaluated. In this test, in order to measure the internal resistance and the battery voltage, a plurality (e.g. a hundred) of each type of sample are prepared for measuring internal resistance and also a plurality (e.g. a hundred) of the same sample are prepared for measuring the battery voltage. The internal resistance and the battery voltage were measured for all the samples of the same type, and average values thereof were used as test results.

Internal Resistance Characteristics

Figure 2A:
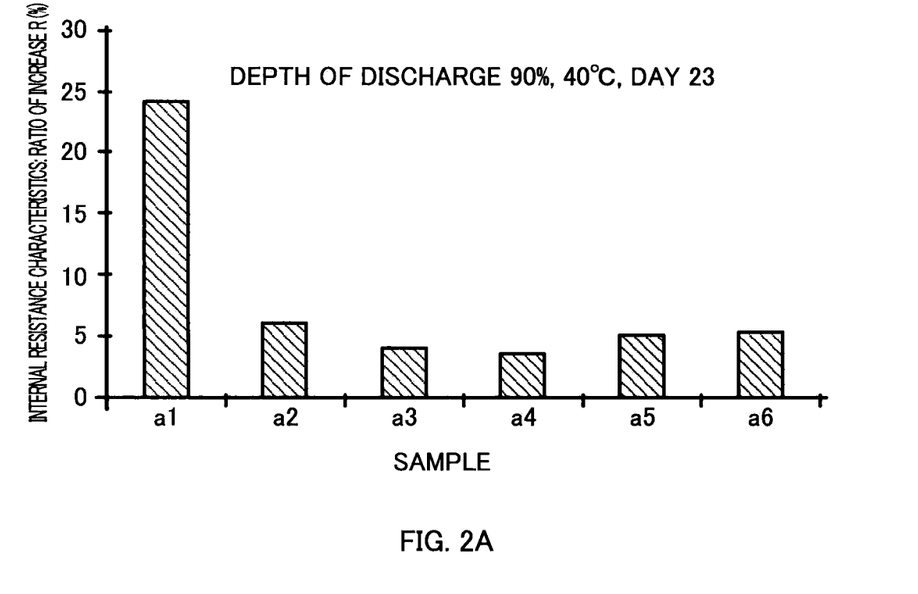
FIGS. 2A and 2B are graphs showing internal resistance characteristics of spiral-wound lithium primary batteries which have been stored at a temperature of 40° C. after 90% of the design capacity is discharged, each of spiral-wound lithium primary batteries differing in the amount of hydroxyphthalimide which is added to the organic electrolytic solution of the battery.
Figure 2B:
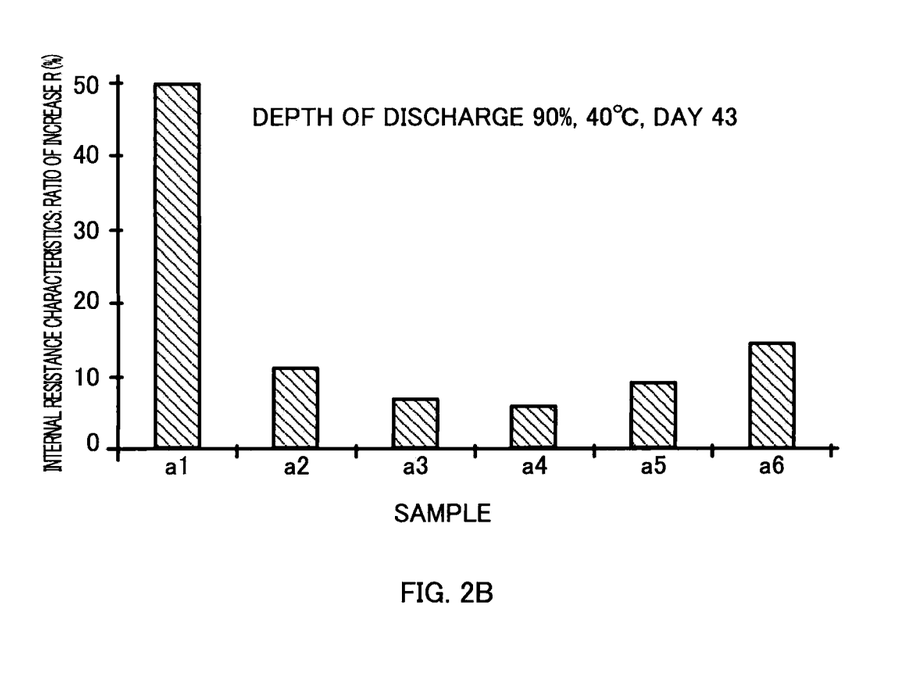

FIGS. 2A and 2B show internal resistance characteristics of samples in deep-DOD storage test. FIGS. 2A and 2B show internal resistance in 23 days (on day 23) and in 43 days (on day 43) after the samples have been left at a temperature of 40° C. In the figures, the ratio of increase R (=R2/R1×100(%)) is shown for each of the samples a1-a6: the internal resistance value R1 at the time of start (day 0); and the internal resistance value R2 in certain days after being stored. As shown in FIG. 2A, on day 23 after being stored, for each of the samples a2-a6 in which HPI is added, the ratio of increase R of the internal resistance value is about 1/5 to 1/10, compared to the ratio of the sample a1 in which HPI is not added. As shown in FIG. 2B, on day 43 after being stored, for each of the samples a2-a6, the ratio of increase R of the internal resistance value is about 1/4 to 1/10, compared to the ratio of the sample a1. The value of the sample B is about one quarter to one tenth of that of the sample A.

Battery Voltage Characteristics

Figure 3A:
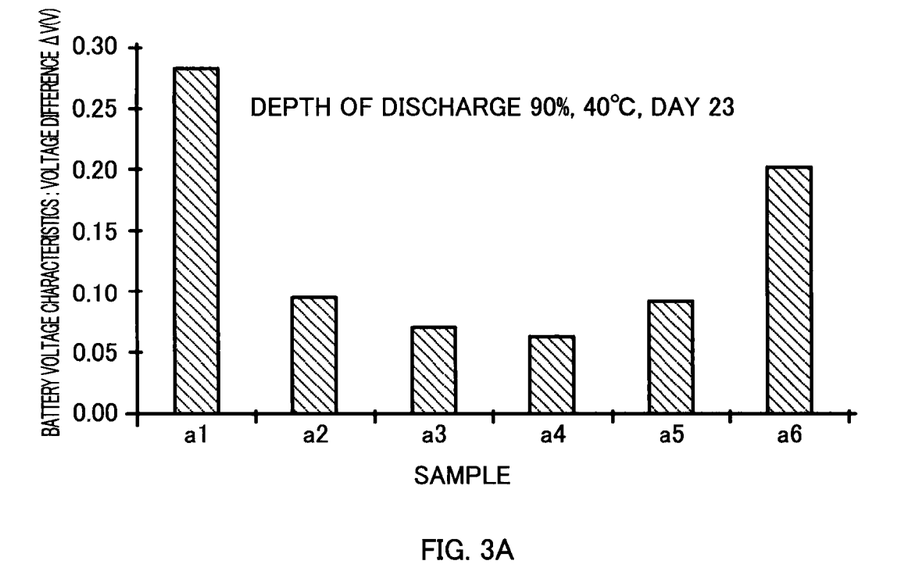
FIGS. 3A and 3B are graphs showing battery voltage characteristics of spiral-wound lithium primary batteries which have been stored at a temperature of 40° C. after 90% of the design capacity is discharged, each of the lithium primary batteries differing in the amount of hydroxyphthalimide which is added to the organic electrolytic solution of the battery.
Figure 3B:
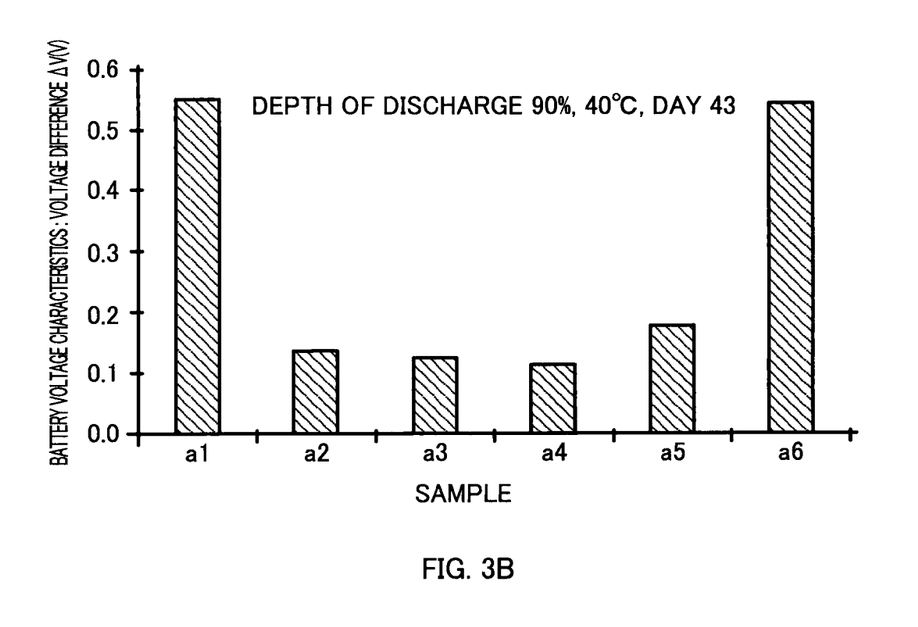

FIGS. 3A and 3B show the battery voltage characteristics of the samples in deep-DOD storage test: FIGS. 3A and 3B respectively show the battery voltage characteristics on day 23 and on day 43 after the samples whose depth of discharge is 90% are stored at a temperature of 40° C. Specifically, the battery voltage characteristics of the samples a1-a6 is so-called "pulse performance", and is the voltage difference $\Delta V$ between the following closed circuit voltage V1 and open circuit voltage V2 (=V2−V1): the closed circuit voltage V1 being measured when a load of 50Ω is applied for 0.29 seconds to the samples which are in 23 days and in 43 days after being stored at a temperature of 40° C. and which are cooled to room temperature; and the open circuit voltage V2 being measured before the load is applied.

As shown in FIG. 3A, on day 23, for each of the samples a2-a6, the voltage difference $\Delta V$ is about 1/3 to 2/3 of that of the sample a1. As for the samples a2-a5, the voltage differences $\Delta V$ are, in particular, about 1/3 of the voltage difference $\Delta V$ of the sample a1 and shows an excellent characteristics. As shown in FIG. 3B, on day 43, though the sample a2 to the sample a5 keep characteristics as much as those on day 23, the sample a6 in which HPI is added at 5.0 wt % shows characteristics as much as the sample a1, which is a conventional example.

Thus, in the lithium primary battery, it is confirmed that adding HPI to the base electrolytic solution at 0.1 wt % or more and 5.0 wt % or less produces the effect of preventing increase of the internal resistance, which is one of the storage characteristics at the end stage of discharge. Also, until day 23, it has been possible to improve battery voltage characteristics at the end stage of discharge. It is confirmed that adding HPI at 0.1 wt % or more and 1.0 wt % or less enables the excellent battery voltage characteristics to be kept on day 43 after being stored. As for a reason that the battery voltage characteristics of the sample a6 were inferior to those of the samples a2-a5, it can be considered that the excessive amount of the added HPI causes excessive forming of coating on the positive and negative electrodes and that the deterioration of ionic conductivity predominates over the increase of battery voltage characteristics by the coating.

From the two test results mentioned above, in order to improve the storage capability of the lithium primary battery at the end stage of discharge, it is sufficient to use the electrolytic solution in which HPI is added to the base electrolytic solution at 0.1 wt % or more and 5.0 wt % or less. It is more preferable that adding of 0.1 wt % or more and 1.0 wt % or less can improve battery voltage characteristics without the deterioration of ionic conductivity.

High-Temperature Storage Test

Construction of Samples

Figure 4A:
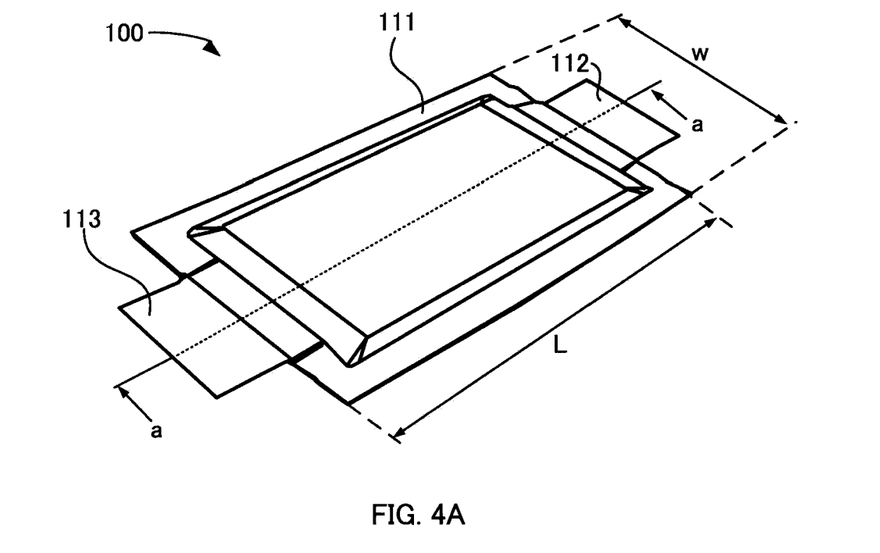
FIGS. 4A and 4B are diagrams showing the construction of a laminate type lithium primary battery.
Figure 4B:
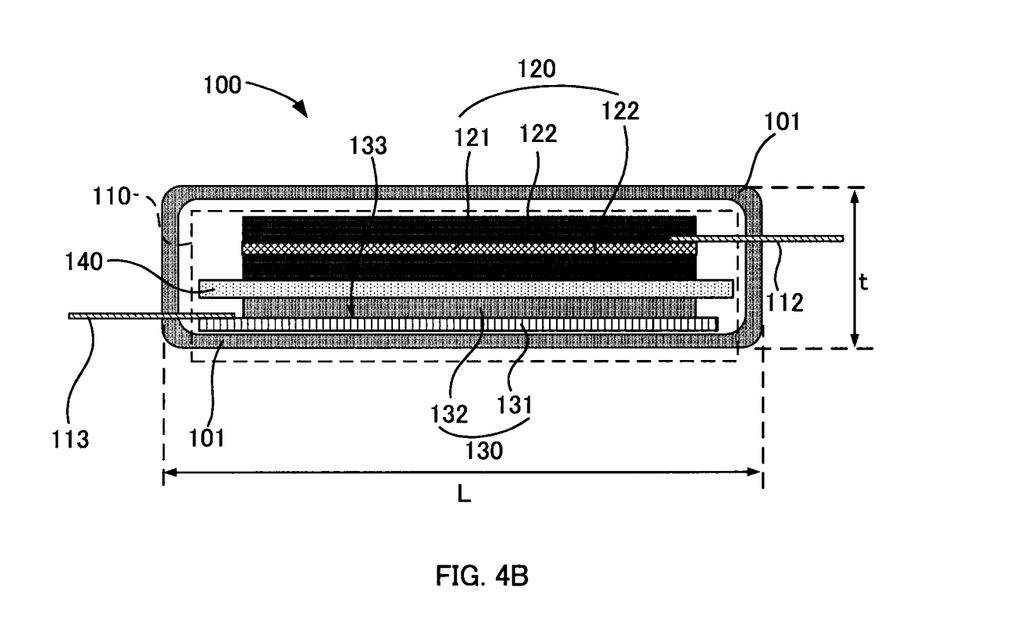

In the high-temperature storage test, laminate type lithium primary batteries are employed as samples. FIGS. 4A and 4B show the construction of the laminate type lithium primary battery 100 which are the samples. FIG. 4A is a diagram showing the appearance thereof. FIG. 4B is a diagram illustrating the internal construction thereof and is a schematic cross section viewed from arrows a-a in FIG. 4A. As shown in FIG. 4A, the lithium primary battery 100 illustrated herein has a construction in which a flat, rectangle jacket 111 made of laminated film accommodates an active part composed of a positive electrode, a negative electrode and an electrolytic solution (to be described later) and in which a positive plate 112 and a negative plate 113 reach outside the jacket 111, the positive plate 112 and the negative plate 113 respectively connecting to the internal positive electrode and negative electrode for supplying power to external loads.

As shown in FIG. 4B, the jacket 111 accommodates an electrode assembly 110 in which a sheet-like positive electrode 120 faces a sheet-like negative electrode 130 and a separator 140 is placed therebetween. The positive electrode 120 is made by applying positive electrode material 122 to a sheet of cathode current collector 121, the positive electrode material 122 being in slurry form like the spiral-wound lithium primary battery which is used in deep-DOD storage test (FIG. 1: symbol 1), the cathode current collector 121 being made of stainless-steel expanded metal. The negative electrode 130 is made by attaching lithium 132 to a surface 133 (the front surface) of a sheet-like anode current collector 131 made of a sheet of cupper. The electrode assembly 110 has a structure in which the negative electrode 130 on the side of the lithium 132 faces the positive electrode 120 and in which the separator 140 is placed between these electrodes. Plates (112 and 113) are respectively connected to the collector 121 of the positive electrode 120 and the collector 131 of the negative electrode 130, and the Plates (112 and 113) reach outside the jacket 111. The sealed jacket 111 is filled with electrolytic solution 150 in which HPI is added to the base electrolytic solution and the amount of the added HPI depends on the samples. It should be noted that the samples immediately after preparation measures thickness t=0.4 mm, length L=27 mm, and width w=22 mm.

Table 2 below shows the amount of the added HPI in the electrolytic solution of each of the samples.

TABLE 2

| Sample | Additive | Amount (wt %) |
|---|---|---|
| b1 | HPI | 0 |
| b2 | HPI | 0.01 |
| b3 | HPI | 0.1 |
| b4 | HPI | 0.4 |
| b5 | HPI | 0.8 |
| b6 | HPI | 1.0 |

Test Method

Figure 5:
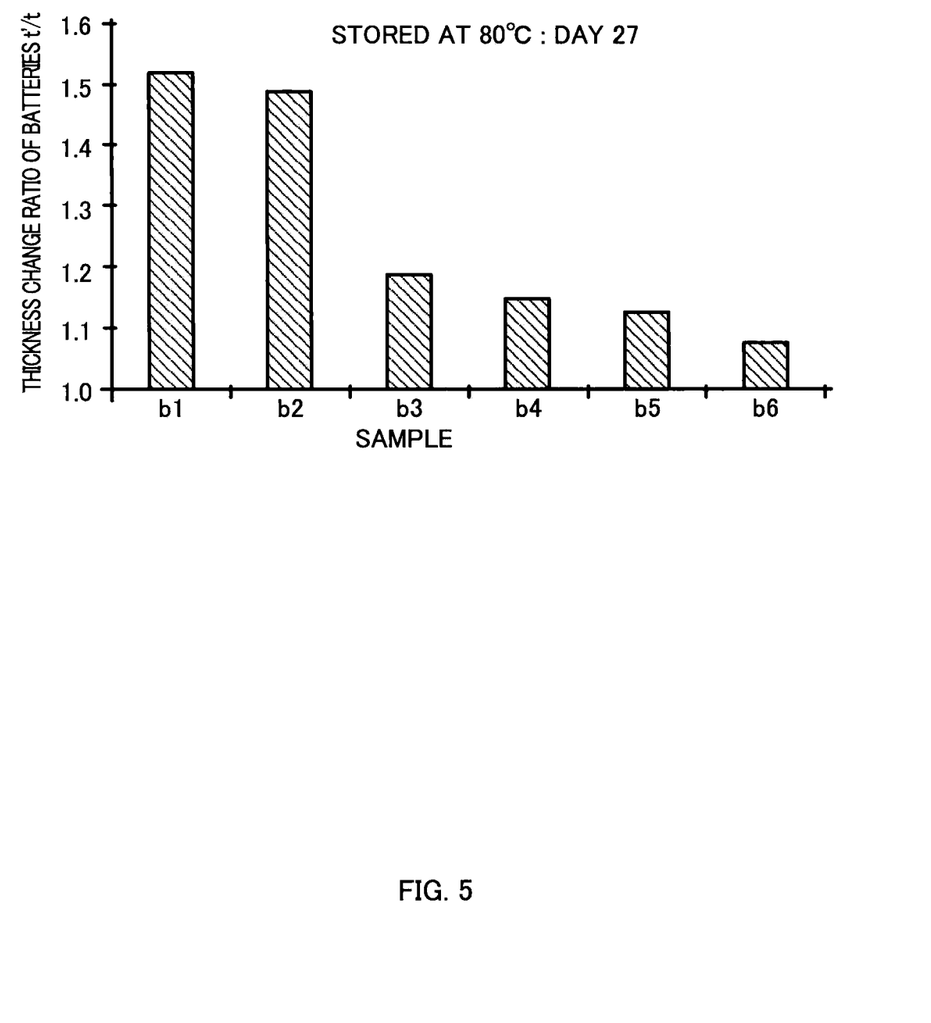
FIG. 5 is a graph showing change of the thicknesses of laminate type lithium primary batteries which are placed at a temperature of 80° C., the laminate type lithium primary batteries differing in the amount of hydroxyphthalimide which is added to the organic electrolytic solution of the battery.

The samples b1-b6 shown in Table 2 was stored at a temperature of 80° C. for 27 days, and the thickness t' of each sample was measured on 27th day. Then, the change ratio t'/t of the initial thickness t=0.4 mm was obtained. FIG. 5 shows results of the samples b1-b6 in the high-temperature storage test. As shown in FIG. 5, the thickness of the sample b1 to which HPI is not added is 1.55 times the thickness of the initial thickness t, and the thickness of the sample b2 to which HPI of 0.01 wt % is added is 1.49 times like the sample b1. On the other hand, as for the sample b3 to which HPI of 0.1 wt % or more is added, the thickness change ratio t'/t decreases remarkably and the thickness is less than 1.2 times. The thickness change ratio t'/t decreases as the amount of the added HPI increases from the sample b3 to the sample b4 to the sample b5 to the sample b6. It is therefore confirmed that the storage characteristics at elevated temperatures improves when the amount of the added HPI is 0.1 wt % or more to the base electrolytic solution. Also, it is found that the appropriate lower limit of the amount of the added HPI is 0.1 wt %.

Hydroxyphthalimide Derivative

It has been found from the foregoing test result that, in the lithium primary battery in which a suitable amount of HPI is added to the electrolytic solution, the storage capability at the end stage of discharge and the storage characteristics at elevated temperatures improve. Incidentally, as for hydroxyphthalimide, derivatives exist. As well known, a derivative is a type of organic compound which is modified in the degree that the structure and properties of the original compound do not significantly change. Using a HPI derivative as an additive instead of HPI, it is therefore anticipated that the same effect can be obtained. Characteristics of a lithium primary battery in which an HPI derivative is added have been evaluated. Specifically, the following samples were prepared: a spiral-wound lithium primary battery using electrolytic solution in which HPI derivative is added; and a spiral-wound lithium primary battery using the base electrolytic solution which does not contain additive. And characteristics of the samples were evaluated. The section below will describe concretely the prepared samples, an evaluation method and the like.

Figure 6A:
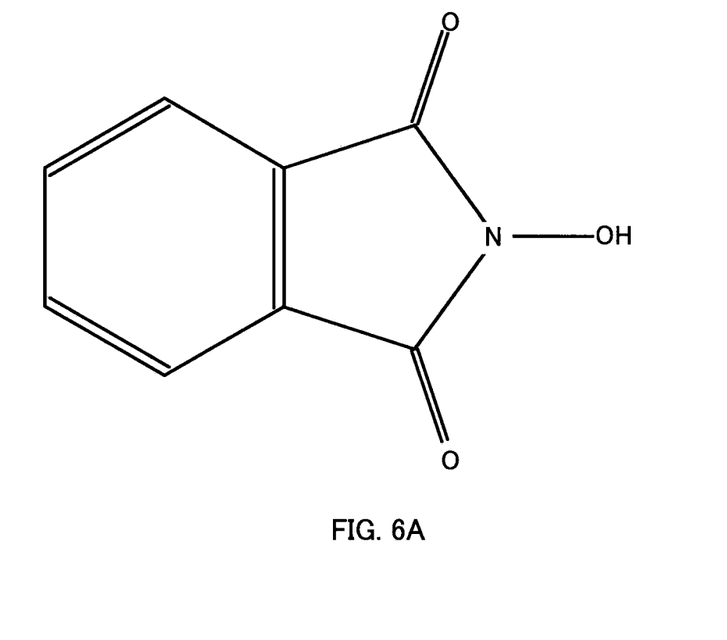
FIGS. 6A and 6B are diagrams illustrating the structures of hydroxyphthalimide and hydroxyphthalimide derivative.
Figure 6B:
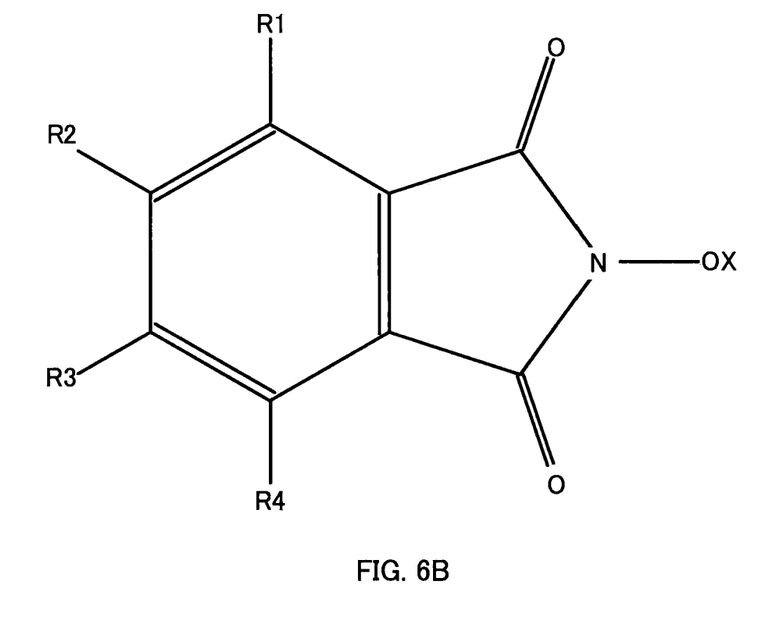

FIGS. 6A and 6B are diagrams illustrating the structures of HPI and a derivative thereof: FIG. 6A shows the structure of HPI; and FIG. 6B is a diagram illustrating the structure of a derivative of it. The HPI derivative has the structure of HPI shown in FIG. 6A in which the hydrogen (X) in the hydroxyl group shown in FIG. 6B and the hydrogens (R1, R2, R3 and R4) at carbon position 4, 5, 6, and 7 have been respectively replaced by suitable functional groups. As examples of the functional groups, there are an alkyl group, a halogeno group, a methyl group and the like. The samples were prepared using, as an additive, N-Methylphthalimide (hereinafter referred to as MPI) in which the hydrogen (X) in the hydroxyl group has been replaced by a methyl group.

Table 3 below shows compositions of the prepared samples.

TABLE 3

| Sample | Additive | Amount (wt %) |
|---|---|---|
| c1 | MPI | 0 |
| c2 | MPI | 1.0 |

As shown in Table 3, the electrolytic solution to which MPI has not been added is used in the sample c1. In the sample c2, the electrolytic solution in which MPI is added to the base electrolytic solution at 1.0 wt % is used. A test in which samples c1 and c2 is stored at the end stage of discharge and at elevated temperatures is conducted. Here, the test was conducted in which the samples whose depth of discharge was 100%, that is the design capacity thereof was completely discharged, were stored at a temperature of 80° C.

Figure 7A:
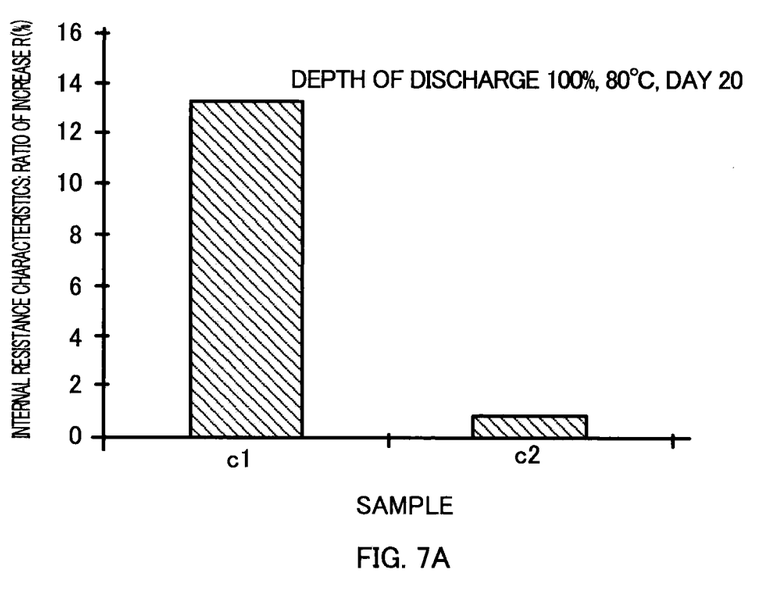
FIGS. 7A and 7B are graphs showing internal resistance characteristics of spiral-wound lithium primary batteries which have been stored at a temperature of 80° C. after 100% of the design capacity is discharged, each of spiral-wound lithium primary batteries differing in the amount of N-Methylphthalimide (a hydroxyphthalimide derivative) which is added to the organic electrolytic solution of the battery.
Figure 7B:
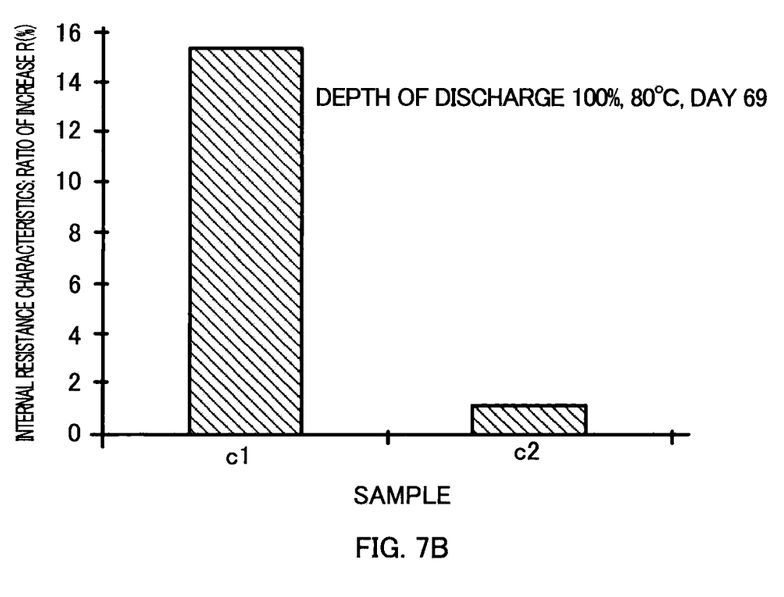

FIGS. 7A and 7B show the result of the test. FIGS. 7A and 7B each show the ratio of increase R (%) of the internal resistance, respectively in 20 days and 69 days after being stored. As shown in FIG. 7A, on 20th day after being stored, whereas the internal resistance of the sample c1 increases by about 14%, the ratio of increase R of the internal resistance of the sample c2 is less than 1%. As shown in 7B, on 69th day after being stored, whereas the ratio of increase R of the sample c1 is 15% or more, that of the sample c2 is about 1%. Thus, it is confirmed that, in the lithium primary battery in which the HPI derivative is added to the electrolytic solution, storage characteristics at the end stage of discharge and storage characteristics at elevated temperatures improve like the lithium primary battery in which the HPI is added to the electrolytic solution.

Other Embodiments

In the present embodiment, A suitable amount of HPI or a derivative thereof is added to commonly-used various electrolytic solutions for lithium primary batteries. Without departing from the gist thereof, the invention is not limited to the foregoing embodiment. For example, the constructions of lithium primary batteries are not limited to spiral-wound cell and laminate type, and well-known inside-out cell (also referred to as a bobbin type cell) and a coin cell may also be employed.

As for the base electrolytic solution, the proportions of three components (DME, PC and EC) in the solvent may, for example, differ from the foregoing embodiment. It goes without saying that the base electrolytic solution may not be a three-component solution. Any electrolytic solution commonly used in Li primary batteries such as buthylene carbonate (BC), dioxolane (DOXL), gamma-butyrolactone ($\gamma$-BL), tetrahydrofuran (THF) may be employed as components.

This applies equally for supporting electrolyte. For example, it is acceptable to use the following substances: $LiN(CF_3SO_2)_2$, $LiN(C_2F_5SO_2)_2$, $LiN(CF_3SO_2)$, $(C_4F_9SO_2)$, which are lithium salts of fluorine-containing acid imides except for $LiCF_3SO_3$ used in the foregoing example; lithium salts of fluorine-containing acids ($LiPF_6$, $LiBF_4$, lithium salt of fluorine-containing acid methide $LiC(CF_3SO_2)_3$; a lithium salt of chlorine-containing acid $LiClO_4$; and the like.

What is claimed is:

1. A lithium primary battery, comprising:
    a positive electrode which contains manganese dioxide as a cathode active material;
    a negative electrode
        which is composed of either lithium or lithium alloy, and
        which has a surface area smaller than that of the positive electrode,
        the lithium and lithium alloy serving as an anode active material;
    a base electrolytic solution
        that is composed of organic solvent and electrolyte; and
    an additive which contains either one of hydroxyphthalimide and hydroxyphthalimide derivative the additive of 0.1 wt % or more and 5.0 wt % or less is added to the base electrolytic solution.

2. A lithium primary battery according to claim 1, wherein the additive of 0.1 wt % or more and 1.0 wt % or less is added to the base electrolytic solution.

\* \* \* \* \*